Patented Dec. 5, 1939

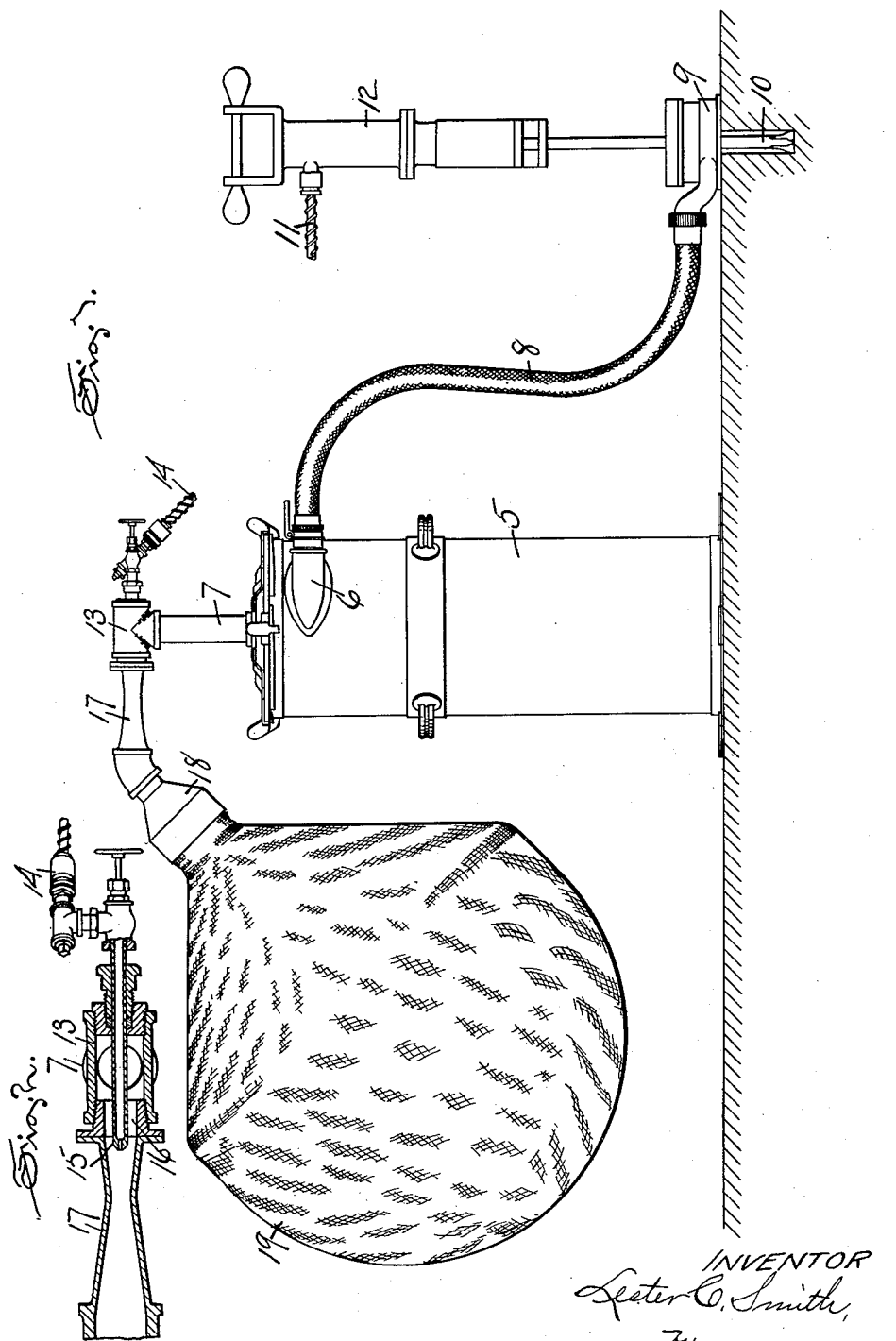

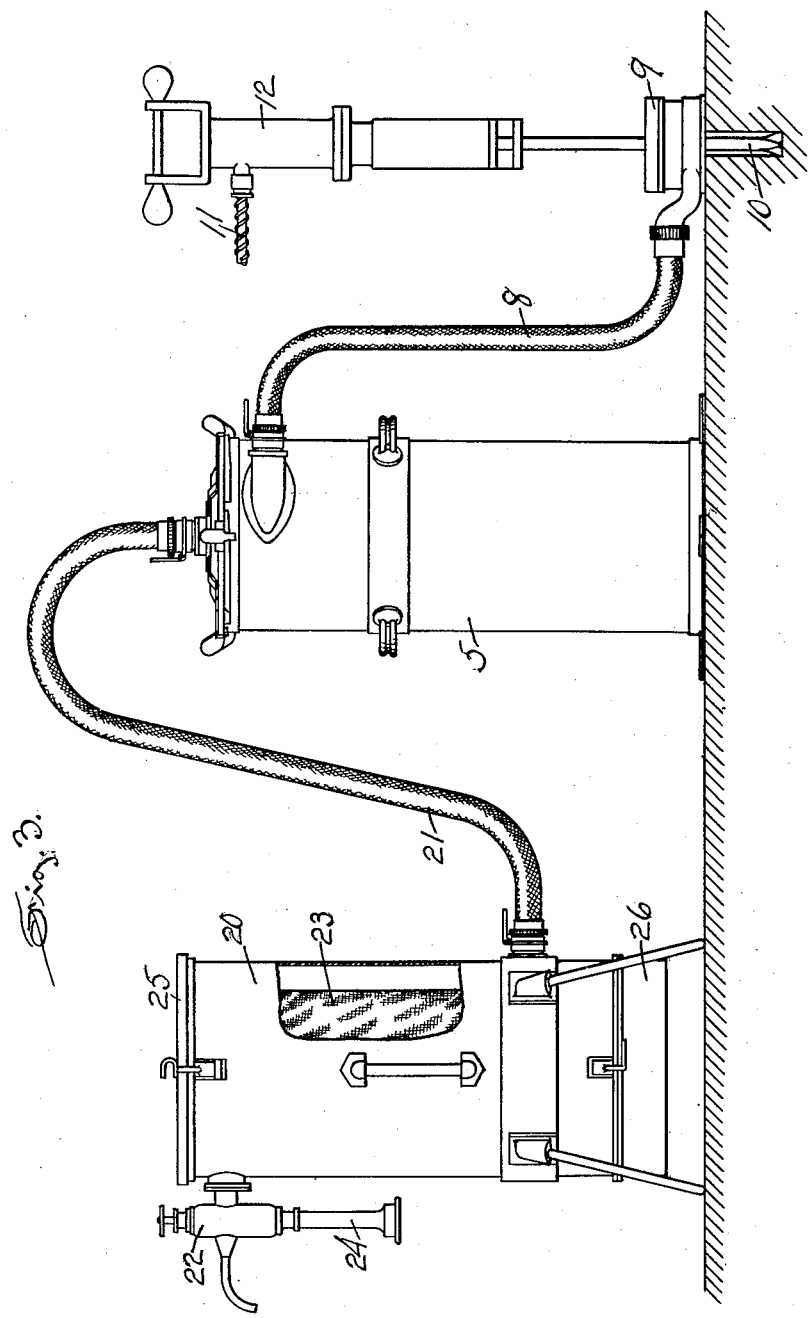

2,182,165

UNITED STATES PATENT OFFICE 2,182,165

DUST SEPARATOR AND COLLECTOR

Lester C. Smith, West Hartford, Conn., assignor to The Spencer Turbine Company, Hartford, Conn., a corporation of Connecticut Application February 19, 1938, Serial No. 191,454

8 Claims. (Cl. 183—34)

This invention relates to the class of apparatus which are employed for collecting and separating dirt, dust, and the like from the air, and an object of the invention, among others, is the production of an apparatus of this type that shall be simple in construction and particularly efficient in operation to produce the results just mentioned.

One form of a dust separator and collector embodying the invention and in the construction and use of which the objects herein set out, as well as others, may be attained is illustrated in the accompanying drawings in which—

Figure 1 is a side view of an apparatus embodying the invention.

Figure 2 is a detail view illustrating the vacuum creating device employed in this apparatus.

Figure 3 is a view in elevation of an apparatus embodying a modification of the invention.

This my improved dust separator and collector is particularly adapted for use in connection with rock drilling operations and for this reason its use in such connection is illustrated in the drawings herein. It will, however, be understood that the apparatus is not limited in its use to such mechanism. In some States the law requires that the dust collectors employed in connection with rock drilling operations, or other operations involving the separation of dust, shall be capable of eliminating the dust to such extent that the air will be substantially pure, this purity being such that the air will not be harmful for breathing purposes. The law in some States also requires an apparatus which will need attention to remove the collected dust not more than twice a day.

My improved apparatus is constructed with these objectives in mind and it possesses the capability of eliminating the dust to an extent to meet all of the requirements imposed by law or otherwise, and it also provides means for effectively collecting the dust without back pressure or filter resistance to require frequent attention.

In the accompanying drawings the numeral 5 denotes a primary separator that may be of ordinary construction common to the art of dust separators and well understood by those skilled in this art and for this reason a detailed description and illustration are omitted herein, it being sufficient to state that the matter entering the case of the separator through the inlet 6 acquires a centrifugal motion within the case and is directed downwardly and then upwardly through the outlet 7 which extends downwardly into the case and below the inlet to such extent that the air currents suddenly change their downward and circular movements as they pass into the outlet with a result that the heavier portions or particles of matter under the action of gravity drop to the bottom of the case, and only the finer particles of dust pass out into the outlet 7.

In the device herein shown a tube 8 is seen extended from a dust collecting hood 9 of a type commonly employed in rock drilling operations, this hood receiving the dust created by a drill 10 operated under air pressure through a tube 11 connected to the case 12 of a rock drilling equipment in a manner that will be readily understood.

In order to create a partial vacuum within the separator 5 I employ an exhauster operating upon the ejector or jet principle and secured to the end of the outlet 7, as shown in Fig. 1 of the drawings. This ejector comprises a case 13 connected by a tube 14 with a source of steam or air supply, preferably and usually the latter, and this source may be the same as that for supplying the tube 11 with pressure.

The case 13 contains a nipple 15 communicating with the inlet tube 14 and extending through the case past the outlet 7 from the separator 5 and through an outlet opening 16 from the case 13 and into a venturi 17, which opens through a mouthpiece 18 into a filter bag 19. This filter bag is of such construction that while it will permit escape of air it will separate the dust therefrom to the extent required.

The operation of the ejector causes a partial vacuum in the separator 5 sufficient to carry the dust laden air from the hood 9 through the separator and into the ejector case from which point it is blown into the bag 19. With the apparatus thus arranged I have been enabled to produce most satisfactory results but it is not absolutely essential that the ejector shall be located between the two separating mediums, and in Fig. 3 of the drawings I have shown an apparatus in which the ejector or air jet exhauster is located at the end of the system. In this arrangement the dust laden air is collected in the hood 9 and is carried by the tube 8 to the primary separator as hereinbefore explained. The filter bag, however, is located in a filter bag case 20, the opening into the mouth of the filter bag being directly connected with a tube 21 extending from the separator 5. An ejector case 22 is connected to draw the air from which the dust has been extracted directly from the chamber within the case 20, this ejector being supplied with air or steam, preferably air, through a tube not shown extending from any suitable source of supply. The air is exhausted through an exhaust outlet 24 into the open atmosphere.

In this form of the device the operation of the ejector is sufficient to create enough vacuum in the separators 5 and 20 to draw the dust from the drill hood 9 into them, the cleared air after passing through the filter bag 23 being blown into the open atmosphere.

As hereinbefore explained it will be seen that this apparatus is such as to effectively filter the dust laden air to every extent required and the capacity is such as to take care of the dust produced from substantially four hours drilling operations. In fact the air is filtered to such extent that it is suitable for breathing purposes and answers every requirement as such, and by the term "pure" as used in the claims herein is meant air that is sufficiently free from harmful material and that has been purified to an extent to rid it from particles that by lodgement in the lungs would create trouble. I have found that the use of a vacuum producer acting on the jet or ejection principle and located to draw the air through the primary or coarse filter will most thoroughly produce the results aimed at by me and the location and type of this device for producing the air currents is of material advantage in my apparatus.

There is a very distinct operating advantage in constructing the primary and secondary separators as separate units, both from a standpoint of portability as well as from the standpoint of easy maintenance. It is quite possible to obtain anywhere from four hundred to twelve hundred pounds of dust from a single rock drill during the course of an eight hour day, and it will therefore be appreciated that when these volumes and weights are considered ease of handling and ready portability are important features. With the apparatus as shown in Fig. 1 the bag 19 and the separator 5 may be separately removed with little inconvenience and an empty bag and separator substituted with the loss of a minimum amount of time. In the apparatus as shown in Fig. 3 the separator 5 may be readily removed and a new one supplied.

It will be understood that the ejector is connected with the mouth of the bag 23 to draw air through the bag from the chamber within the case 20, said bag being suitably supported to resist collapse under the action of the ejector.

The top 25 is removed from the separator 20 and the bag 23 is shaken in any suitable manner to remove the dust therefrom and deposit it in the removable pan 26 at the bottom of the separator. The pan may then be removed and the dust disposed of after which the machine is again ready for operation.

In accordance with the provisions of the patent statutes, I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. In a portable dust separator and collector system, a primary separator constructed to separate and collect the heavier particles by the action of centrifugal motion and gravity, a secondary separator including a filter bag, a conduit connection between the two separators readily detachable therefrom whereby the primary separator may be withdrawn from the system for replacement by a similar unit for substantially uninterrupted operation of the system and an impeller in the system to effect air flow therethrough.

2. In portable dust separation and collection apparatus adapted for receiving the dust-laden air from a rock drill hood, primary and secondary separators, an inlet conduit for the primary separator and a conduit connection between the two separators, an impeller in communication with both primary and secondary separators to induce flow of air currents therethrough and through said conduits and a removable cover for the primary separator to which the conduit connection between the two separators is connected whereby the dust collection portion of the primary separator may be easily withdrawn for replacement by a similar unit for substantially uninterrupted operation of the apparatus and without disturbing the conduit connection between the two separators.

3. In portable dust separation and collection apparatus adapted for receiving dust-laden air from a rock drill hood, separately portable primary and secondary separators, an inlet conduit for the primary separator and a conduit connection between the two separators, an impeller to effect air flow through both primary and secondary separators and said inlet conduit, said conduit connections with the primary separator being quickly detachable from the primary separator whereby the primary separator may be easily and quickly withdrawn from the apparatus for replacement by a similar unit for substantially uninterrupted operation of the apparatus.

4. Dust separation and collection apparatus of the character set forth in claim 2, characterized by the secondary separator including a filter bag and the impeller being connected to the cover of said primary separator and to said filter bag.

5. Dust separation and collection apparatus as set forth in claim 2, characterized by the secondary separator including a filter bag and the impeller being connected to the outlet side of the secondary separator.

6. In portable dust separation and collection apparatus adapted for receiving the dust-laden air from a rock drill hood, separately portable primary and secondary separators, an inlet conduit for the primary separator and a conduit connection between the two separators, and an impeller to effect air flow through both primary and secondary separators and air flow into said inlet conduit.

7. A dust collector for use in prolonged rock drilling operations in congested quarters requiring frequent removal of the collected dust, said collector including a portable primary separator comprising a receiver containing means to separate and collect the heavier particles by the action of centrifugal motion and gravity, a cover readily detachably secured to said receiver, a portable secondary separator including a filter bag, a conduit connection between said cover and the secondary separator whereby the primary separator comprising said receiver may be readily replaced by a separator of duplicate construction, an inlet conduit connected to the primary separator, and an impeller to effect air flow through both primary and secondary separators and conduits.

8. A dust collector for use in prolonged rock drilling operations in congested quarters requiring frequent removal of the collected dust and adapted for receiving the dust-laden air from a rock drill hood, said collector including a primary separator and a secondary separator arranged in tandem relation, said secondary separator including a filter bag and said primary separator including a cover readily detachably secured to the receiver whereby a receiver of duplicate construction may be substituted for a full receiver, a conduit connection between said cover and secondary separator, an inlet conduit connected to the primary separator, and an impeller to effect air flow through both primary and secondary separators and conduits.

LESTER C. SMITH.